(12) United States Patent
Kim et al.

(10) Patent No.: US 10,066,688 B2
(45) Date of Patent: Sep. 4, 2018

(54) CALIPER BRAKE APPARATUS

(71) Applicant: HYUNDAI MOBIS CO., LTD., Seoul (KR)

(72) Inventors: Sung A Kim, Yongin-si (KR); Se Hoon An, Yongin-si (KR); Byeung Su Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 86 days.

(21) Appl. No.: 15/254,916

(22) Filed: Sep. 1, 2016

(65) Prior Publication Data

US 2017/0248182 A1    Aug. 31, 2017

(30) Foreign Application Priority Data

Feb. 25, 2016   (KR) ........................ 10-2016-0022612

(51) Int. Cl.
| | | |
|---|---|---|
| *F16D 65/09* | (2006.01) | |
| *F16D 65/097* | (2006.01) | |
| *F16D 55/2265* | (2006.01) | |

(52) U.S. Cl.
CPC ..... *F16D 65/0977* (2013.01); *F16D 55/2265* (2013.01)

(58) Field of Classification Search
CPC ........... F16D 65/0977; F16D 55/22655; F16D 65/097; F16D 55/22
See application file for complete search history.

(56) References Cited

U.S. PATENT DOCUMENTS

| 5,687,817 | A | * | 11/1997 | Kobayashi | ............ | F16D 65/097 |
|---|---|---|---|---|---|---|
| | | | | | | 188/72.3 |
| 5,934,417 | A | * | 8/1999 | Kobayashi | ............ | F16D 55/227 |
| | | | | | | 188/1.11 W |
| 5,947,233 | A | * | 9/1999 | Kobayashi | ............ | F16D 55/227 |
| | | | | | | 188/1.11 W |
| D489,655 | S | * | 5/2004 | Byrd | ........................... | D12/180 |
| 2004/0195057 | A1 | * | 10/2004 | Ooshima | ............. | F16D 65/0972 |
| | | | | | | 188/73.38 |
| 2011/0127122 | A1 | * | 6/2011 | Suh | ........................ | F16D 65/095 |
| | | | | | | 188/72.4 |

(Continued)

FOREIGN PATENT DOCUMENTS

| EP | 2495470 A1 | * | 9/2012 | ......... F16D 65/0977 |
|---|---|---|---|---|
| KR | 10-0771004 B1 | | 10/2007 | |
| KR | 2016141434 A | * | 12/2016 | |

*Primary Examiner* — Melanie Torres Williams
(74) *Attorney, Agent, or Firm* — Knobbe Martens Olson & Bear LLP (57) ABSTRACT

Disclosed is a caliper brake apparatus. The caliper brake apparatus includes: a housing that includes a piston capable of moving straight; a carrier that is combined with the housing and mounted on a vehicle such that a disc of the vehicle is positioned therein; a pair of pad plates that is brought in close contact with the disc by straight movement of the piston; and a pair of guides that couple the pad plates and the carrier to each other, in which the pad plates each may have a sliding groove at both sides and the guides each have elastic members that can slide along the sliding grooves. Accordingly, it is possible to ensure sufficient gaps between a disc of a vehicle and the pad plates when the pad plates are separated from the disc after being strongly pressed to the disc of a vehicle.

9 Claims, 11 Drawing Sheets

(56) References Cited

U.S. PATENT DOCUMENTS

| | | | | |
|---|---|---|---|---|
| 2012/0205205 A1* | 8/2012 | Lethorn | .............. | F16D 65/0972 |
| | | | | 188/234 |
| 2014/0367208 A1* | 12/2014 | Miyake | ............... | F16D 65/0978 |
| | | | | 188/72.3 |
| 2016/0185323 A1* | 6/2016 | Kaneko | ................... | B60T 1/065 |
| | | | | 188/73.1 |

\* cited by examiner

CALIPER BRAKE APPARATUS

CROSS-REFERENCE TO RELATED APPLICATIONS

This application claims priority to and the benefit of Korean Patent Application No. 10-2016-0022612 filed in the Korean Intellectual Property Office on Feb. 25, 2016, the entire contents of which are incorporated herein by reference.

TECHNICAL FIELD

The present disclosure relates to an automotive caliper brake apparatus.

BACKGROUND ART

In general, an automotive brake apparatus is a system for decelerating or stopping a vehicle while driving, or keeping a vehicle stopped, and there are a drum brake apparatus and a caliper brake apparatus. A caliper brake apparatus achieves a braking force by strongly pressing a circular disc, which is rotated with a wheel, with friction pads at both sides instead of a drum.

SUMMARY

One aspect of the present invention provides a caliper brake apparatus that reduces drag and improves fuel efficiency of a vehicle by ensuring sufficient gaps between a disc and pad plates when the pad plates that have been strongly pressed to the disc are separated.

An embodiment of the present invention provides a caliper brake apparatus that includes: a housing that includes a piston capable of moving straight; a carrier that is combined with the housing and mounted on a vehicle such that a disc of the vehicle is positioned therein; a pair of pad plates that is brought in close contact with the disc by straight movement of the piston; and a pair of guides that couple the pad plates and the carrier to each other, in which the pad plates each may have a sliding groove at both sides and the guides each have elastic members that can slide along the sliding grooves.

The guides each may include: an upper plate; a lower plate having the elastic members; and a protruding plate connecting the upper plate and the lower plate to each other and protruding toward the pad plates.

The lower end of the lower plate may perpendicularly extend toward the pad plate.

A predetermined space may be formed by cutting off center portions of the protruding plate and the lower plate.

A plurality of elastic members may be formed at different heights inside the lower plate.

The elastic members may bend at first ends that slide along the sliding grooves.

The pad plates may include a first pad plate positioned closer to the piston and a second pad plate positioned to face the first pad plate, protrusions that come in contact with the guides may be formed at both sides of the first pad plate and the second pad plate, respectively, and the sliding grooves may be formed on first sides of the protrusions, respectively.

Support steps that are fitted on the rear side of the protruding plate may be formed on both sides of the carrier.

The elastic members may be smaller in width than the sliding grooves.

The elastic members may be decreased in width as they go to the first ends.

The plurality of elastic members are formed at inside the lower plate.

The plurality of elastic members are different length from each other.

Therefore, the caliper brake apparatus according to an embodiment of the present invention has a structure in which pad plates return in a sliding type, so when the pad plates are released after being strongly pressed to a disc of a vehicle, sufficient gaps can be ensured between the disc and the pad plates, thereby reducing drag and improving fuel efficiency.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of the present invention will be described in detail with reference to the accompanying drawings.

The accompanying drawings illustrating embodiments of the present invention and those illustrated in the drawings may be referred to in the specification in order to fully understand the present invention, operational advantages of the present invention, and objects accomplished by implementing the present invention.

Embodiments of the present invention are described hereafter in detail with reference to the accompanying drawings. However, the present invention may be implemented in various ways and is not limited to the embodiments described herein. Further, for clear description of the present invention, parts not related to the description are not stated and the same reference numerals indicate the same components in the drawings.

Further, throughout the specification, unless explicitly described otherwise, "comprising" any components will be understood to imply the inclusion of other components rather than the exclusion of any other components. Further, in the specification, the terms "~unit", "~er", "module", and "block" mean one unit for processing at least one function or operation and may be achieved by hardware, software, or a combination of hardware and software.

Typical caliper brake apparatuses include a housing accommodating a piston that is moved straightly forward and backward by hydraulic braking pressure, a carrier having a pair of pad plates with a friction pad and fixed to a car body, and a disc rotating with a wheel with an outer edge partially inserted between the pair of pad plates.

A cylinder is formed at the front portion of the housing to transmit hydraulic braking pressure and mount the piston and a support bending to cover the outer pad plate is integrally formed at the rear portion of the housing, so the outer pad plate is pushed to the disc when the brake is applied to decelerate a vehicle.

Further, the carrier is mounted on the knuckle of a vehicle by bolts and the pair of pad plates is disposed in the carrier to slide inward. The pair of pad plates is a first pad plate directly receiving pressure in contact with the free end of the piston and a second pad plate facing the first pad plate. The housing is coupled to the carrier to slide in the same direction as the forward/backward movement direction of the piston through a guide rod.

When a driver presses down a brake pedal and hydraulic braking force is transmitted to the cylinder from a master cylinder, the piston is moved forward by the hydraulic braking pressure. Accordingly, the friction pad of the first plate is instantaneously pressed to a side of the disc rotating with a wheel. Further, hydraulic pressure exists in the cylinder, the housing slidably coupled through the guide rod is moved in the opposite direction and the support pushes the second pad plate correspondingly, so the friction pad of the second plate is pressed to the other side of the disc, thereby generating a braking force.

Further, when the driver releases the brake pedal, the hydraulic braking force applied to the cylinder is removed and the piston is returned by a rollback chamfer inside the housing and elasticity of a rubber seal, so the disc and the pad plates are separated with predetermined gaps therebetween.

However, according to the above brake apparatus, the pad plates are returned only by the elasticity of the piston seal and the rollback chamfer of the housing after being strongly pressed to the disc, so the pad plates are not fully returned to their original position. Therefore, drag may be generated between the pad plates and the disc, thereby reducing fuel efficiency.

Figure 1:
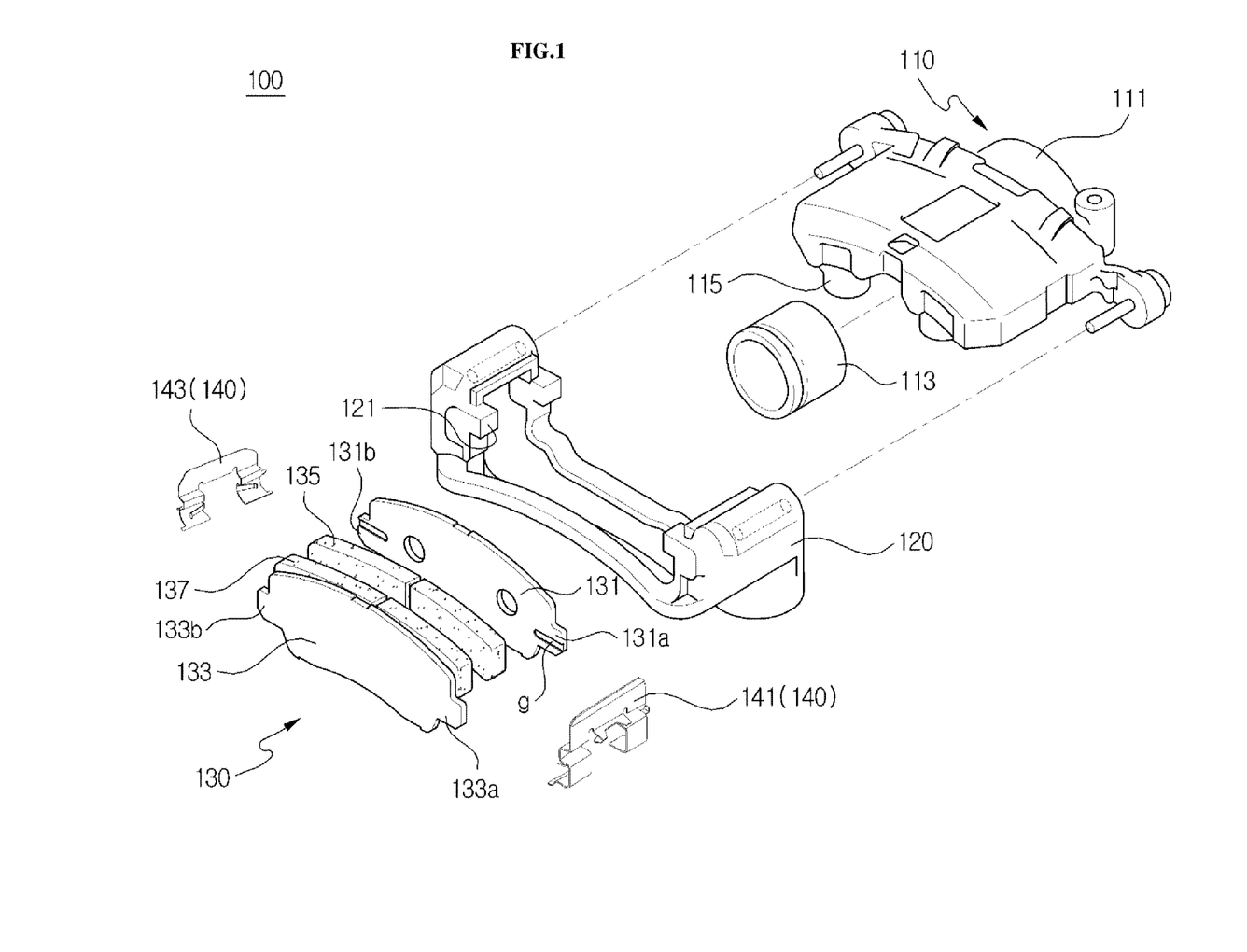
FIG. 1 is an exploded perspective view of a caliper brake apparatus according to an embodiment of the present invention.

Referring to FIG. 1, a caliper brake apparatus 100 according to an embodiment of the present invention may include a housing 110, a carrier 120, pad plates 130, and guides 140.

In the caliper brake apparatus 100, the pad plates 130 are connected to the carrier 120 combined with the housing 110 through the guides 140, a sliding groove 'g' is formed at both sides of the pad plates 130, the guides 140 each have elastic members s1 and s2, so when a piston 113 is moved straight to the pad plates 130 by pressure applied to a cylinder 111 of the housing 110, the pad plates 130 generate a braking force by coming in close contact with a disc of a wheel of a vehicle, in which the elastic members s1 and s2 have an elastic return force by sliding into the pad plates 130 along the sliding grooves 'g'. Further, the pressure applied to the piston 113 of the housing 110 is removed, the elastic members s1 and s2 slide out of the pad plates 130 along the sliding grooves 'g' by the elastic return force, and the pad plates 130 are moved inward and outward along the guides 140, whereby they can be separated from the disc.

Accordingly, the caliper brake apparatus 100 has a structure in which pad plates return in a sliding type, so when the pad plates are released after being strongly pressed to a disc of a vehicle, sufficient gaps can be ensured between the disc and the pad plates, thereby reducing drag and improving fuel efficiency.

The housing 110 may be mounted on a vehicle. The cylinder 111 may be formed on a side of the housing 110. The piston 113 may be disposed in the cylinder 111. The cylinder 111 is connected to a hydraulic channel in a vehicle and can be supplied with hydraulic pressure from a master cylinder of the vehicle through the hydraulic channel when the vehicle is brake. In this case, the piston 113 can be moved straight forward and backward by hydraulic pressure supplied to the cylinder 111.

Supports 115 may be formed at an end of the housing 110. The supports 115 support a second pad plate 113, which is positioned outside, of the pair of pad plates 130 to be described below. The housing 110 may be combined with the carrier 120 through a guide rod to slide in the same direction as the forward/backward movement direction of the piston 113.

Meanwhile, when the piston 113 is moved straight forward, a first pad plate 131 positioned inside generates a braking force by coming in close contact with a side of a disc. Further, the housing 110 slidably combined through the guide rod is moved in the opposite direction by the hydraulic pressure in the cylinder 111 and the supports 115 push the second pad plate 133 positioned outside, so a friction pad 137 on the second pad plate 133 is pressed to the other side of the disc, thereby generating a braking force.

The carrier 120 may be combined with the housing 110. The carrier 120 may be mounted on a vehicle. The carrier 120 may have an empty space therein. Herein, the edge of the disc rotated with a wheel of a vehicle is partially positioned inside the carrier 120.

A support step 121 may be formed on both sides of the carrier 120. The pair of guides 140 is fitted on the support steps 121. The pad plate 130 may be connected to the carrier 120 through the guides 140.

The pair of pad plates 130 may include the first pad plate 131 positioned inside and the second pad plate 133 positioned outside. The friction pads 135 and 137 may be disposed on sides of the first pad plate 131 and the second pad plate 133, respectively. The friction pads 135 and 137 generate friction force by directly coming in contact with a disc of a vehicle.

The first pad plate 131 may be positioned closer to the piston 113. The second pad plate 133 may be positioned to face a side of the first pad plate 131. A disc of a vehicle is positioned between the first pad plate 131 and the second pad plate 133.

Protrusions 131a, 131b and 133a, 133b may be formed on both sides of the first pad plate 131 and the second pad plate 133, respectively. The sliding grooves 'g' may be formed on a side of each of the protrusions 131a, 131b and 133a, 133b. The sliding grooves 'g' at both sides of the first pad plate 131 or the second pad plate 133 may be formed at different heights.

The first pad plate 131 or the second pad plate 133 may be combined with the pair of guides 140 by the protrusions 131a, 131b and 133a, 133b and the sliding grooves 'g'.

The pair of guides 140 can couple to pad plates 130 to the carrier 120 and may include a first guide 141 and a second guide 143. The first guide 141 may be coupled to first sides of the pad plates 130 and the second guide 143 may be coupled to second sides of the pad plates 130. The first guide 141 and the second guide 143 are the same in shape and functions, so the first guide 141 will be described below without description of the second guide 143.

Figure 2:
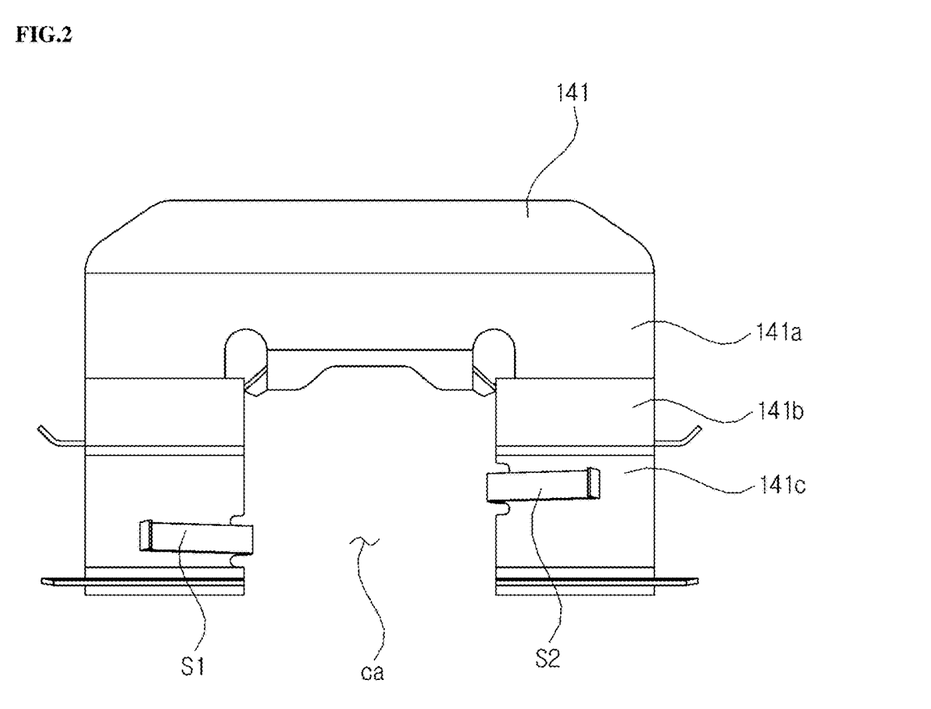
FIG. 2 is a front view of a guide according to an embodiment of the present invention.
Figure 3:
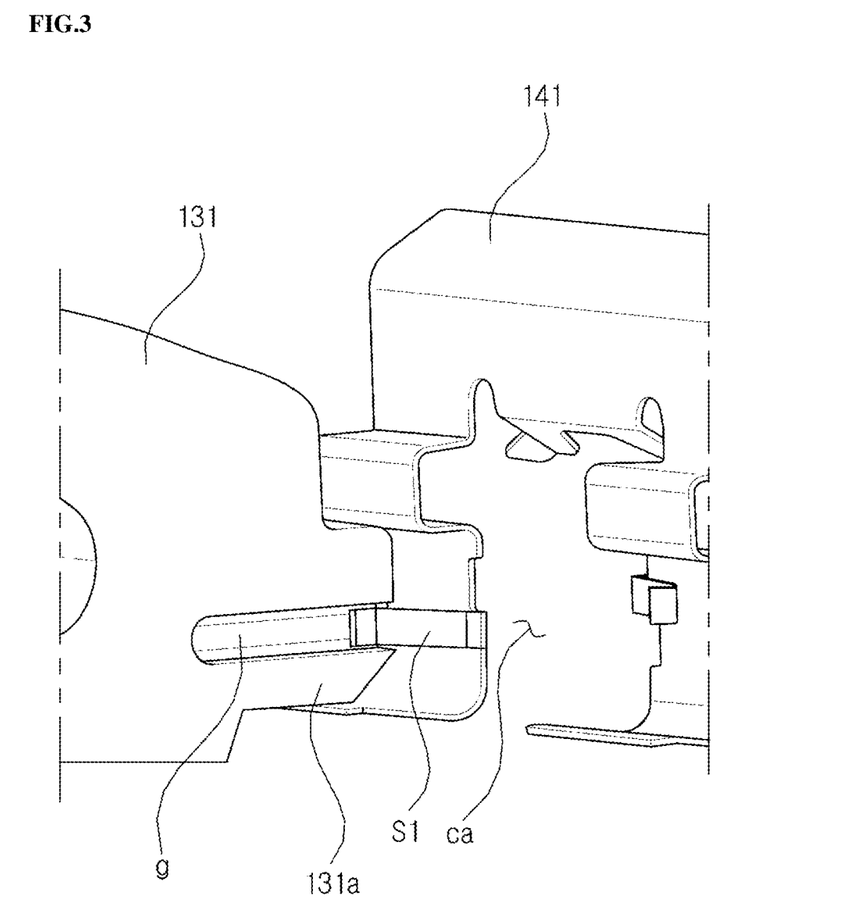
FIG. 3 is a view illustrating connection between a pad plate and a guide according to an embodiment of the present invention.

Referring to FIGS. 1 to 3, the first guide 141 may include an upper plate 141a, a protruding plate 141b, and a lower plate 141c.

The protruding plate 141 can connect the upper plate 141a and the lower plate 141c to each other. The protruding plate 141b may protrude to face a side of the pad plate 130. Herein, when the pad plate 130 and the first guide 141 are coupled, the lower end of the protruding plate 141b is in contact with the upper end of the protrusion 131a. Further, when the first guide 141 and the carrier 120 are coupled, the support steps 121 are fitted on the rear side of the protruding plate 141b.

The lower plate 141c may have a height similar to the height of the protrusion 131a. The lower end of the lower plate 141c may perpendicularly extend from a side toward the first pad plate 131. Herein, when the first pad plate 131 and the first guide 141 are coupled, the lower end of the lower plate 141c is in contact with the lower end of the protrusion 131a.

Meanwhile, a predetermined space 'ca' may be formed by cutting off the center portions of the protruding plate 141b and the lower plate 141c. In embodiments, the protruding plate 141b and the lower plate 141c may be formed in a pair so that the predetermined space 'ca' is formed.

Herein, a plurality of elastic members s1 and s2 may be formed at different heights inside the lower plate 141c defining the predetermined space 'ca.'. For example, the elastic members s1 and s2 may be formed at a lower portion of the left lower plate 141c and an upper portion of the right lower plate 141c, respectively.

Referring to FIGS. 2 and 3, the elastic members s1 and s2 may have the shape of a long rod. The elastic members s1 and s2 may be in contact with the sliding grooves 'g' at first ends, respectively, and may be connected to the lower plate 141c at second ends. The elastic members s1 and s2 may bend at the first ends.

Further, the elastic members s1 and s2 may be smaller in width than the sliding grooves 'g'. The elastic members s1 and s2 may be decreased in width as they go from the second ends to the first ends. Accordingly, the elastic members s1 and s2 can more smoothly slide along the sliding grooves 'g'.

Figure 5:
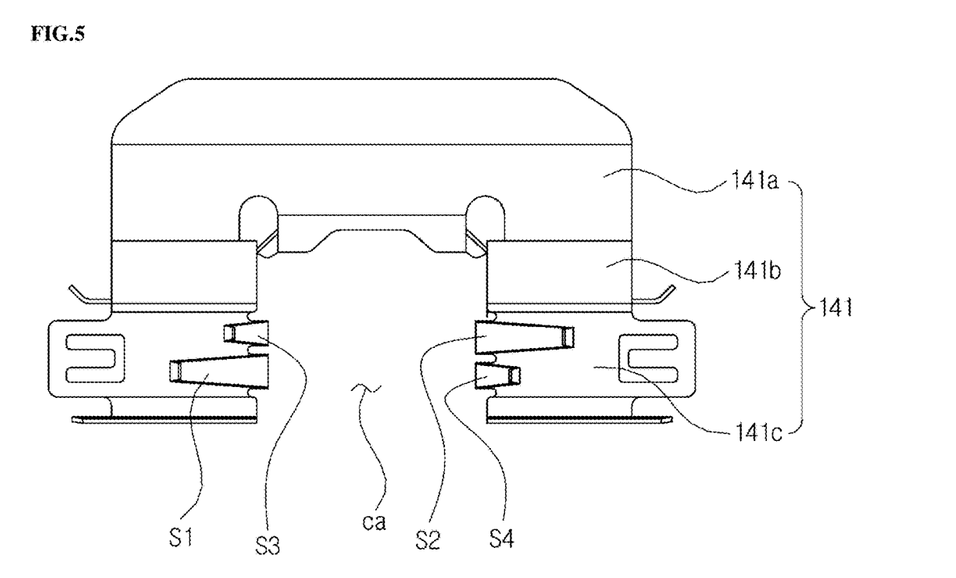
FIG. 5 is a front view of a guide according to an embodiment of the present invention.

Referring to FIG. 5, a plurality of elastic members s3 and s4 may be further formed at inside the lower plate 141c. For example, the third elastic member s3 is formed above the first elastic member s1, the fourth elastic member s4 can be formed below the second elastic member s2. Herein, the third elastic member s3 and the fourth elastic member s4 may be formed shorter than the length of the first elastic member s1 and the second elastic member s2.

Figure 4A:
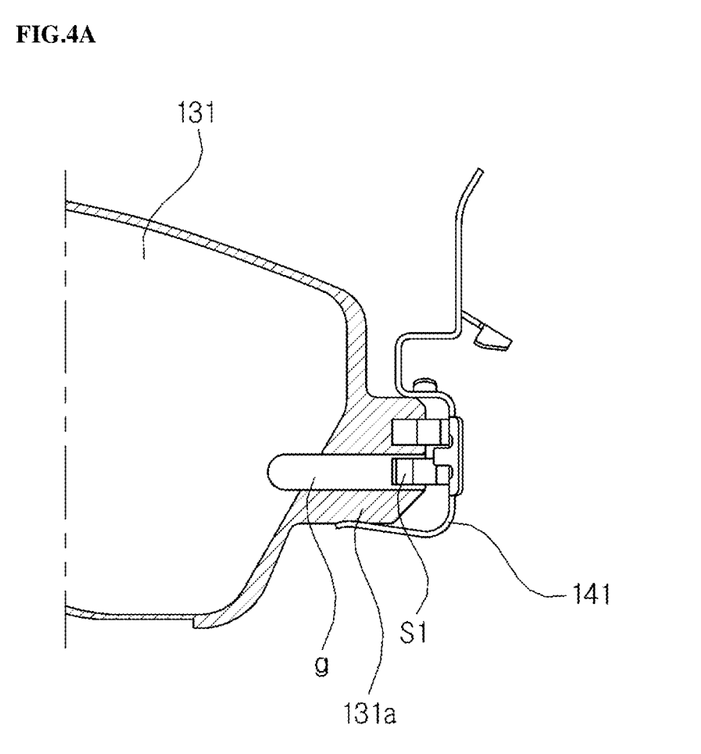
FIG. 4A is a view illustrating first operation of a pad plate and an elastic member according to an embodiment of the present invention.
Figure 4B:
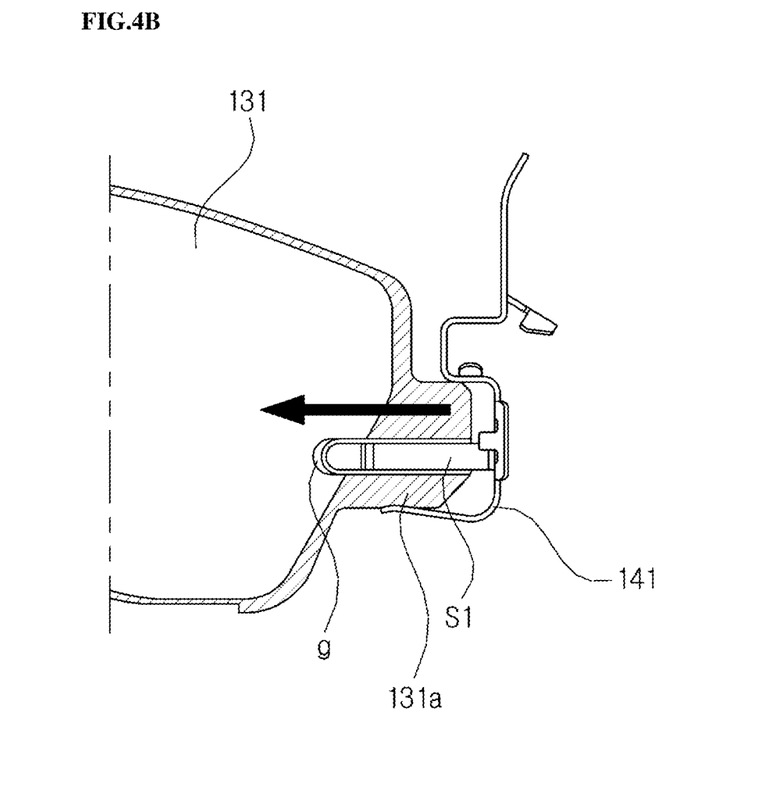
FIG. 4B is a view illustrating second operation of the pad plate and the elastic member according to an embodiment of the present invention.

Referring to FIGS. 4A and 4B, operation of the pad plates 130 and the elastic members s1 and s2 depending on operation of the piston 113 can be seen.

The first pad plate 131 is not in contact with a disc of a vehicle in FIG. 4A, while the first pad plate 131 is in close contact with a disc of a vehicle in FIG. 4B.

When hydraulic pressure is supplied to the cylinder 111 of the housing 110 to decelerate a vehicle, the piston 113 moves straight toward the first pad plate 131, the first pad plate 131 is slid forward along the first guide 141 by the piston 113 and generates friction force by coming in close contact with a disc of the vehicle. Further, in this process, the elastic member s1 slides into the first pad plate 131 along the sliding groove 'g', as illustrated in FIG. 4B, and consequently, the elastic member s1 has elastic return force.

Further, when the hydraulic pressure is not supplied to the cylinder 111 of the housing 110 in order to stop braking the vehicle, the elastic member s1 is slid out of the first pad plate 131 along the sliding groove 'g' by the elastic return force, and the first pad plate 131 slides back away from the disc of the vehicle along the first guide 141, as in FIG. 4A.

Figure 6A:
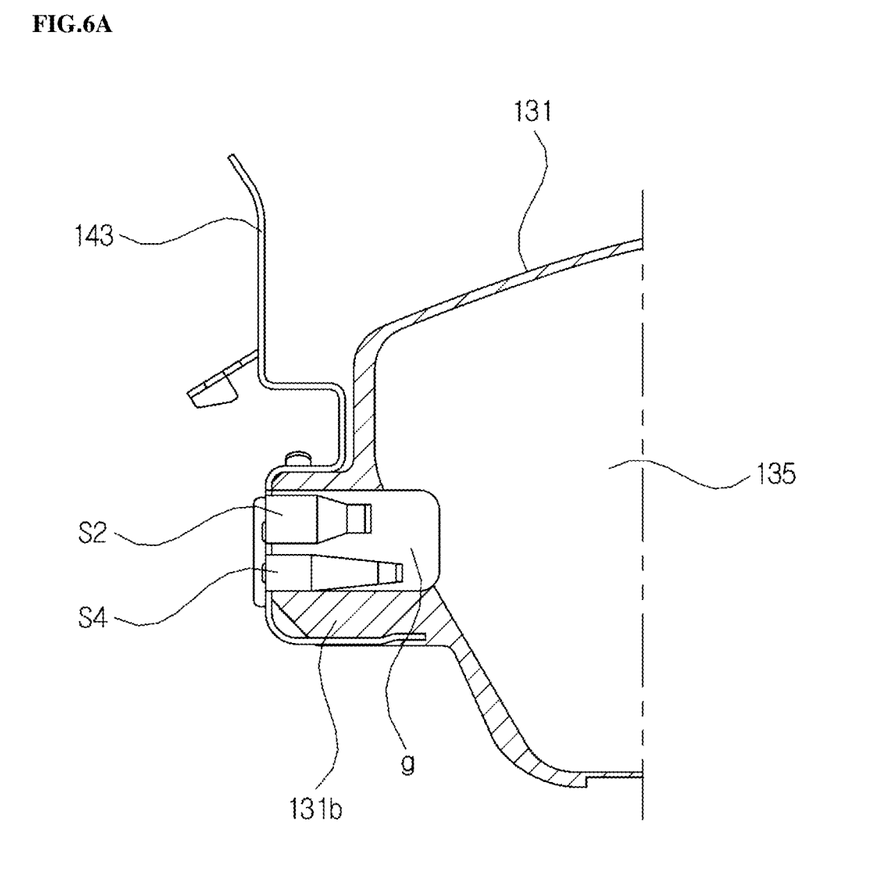
FIG. 6A is a view illustrating operation of the pad plate and the elastic member according to an embodiment of the present invention.
Figure 6B:
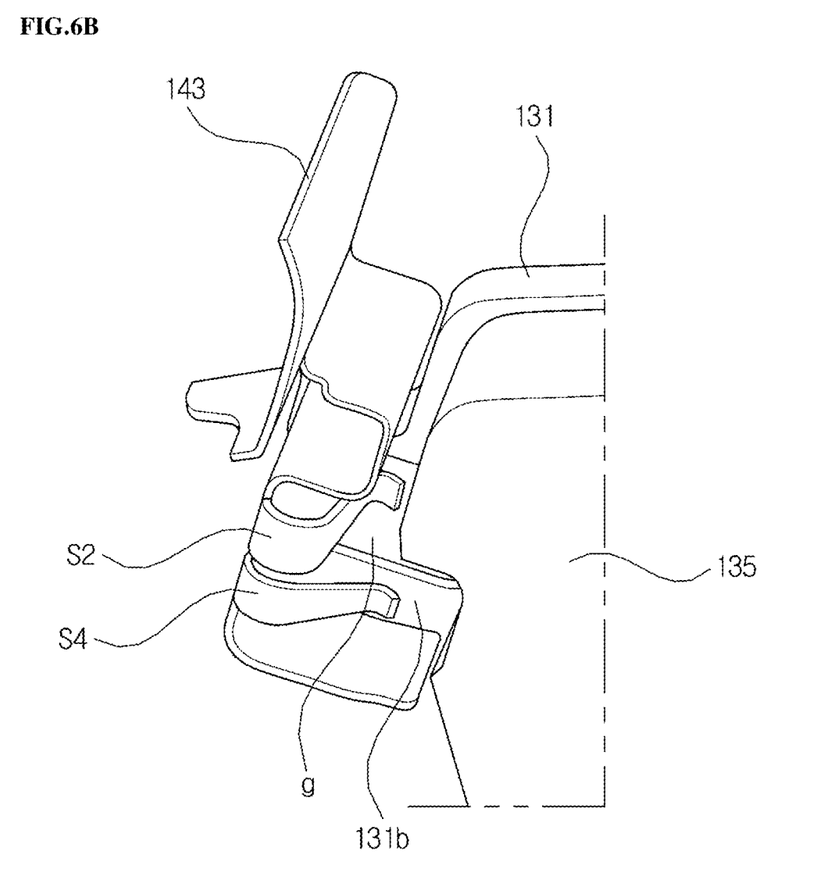
FIG. 6B is a perspective view illustrating operation of the pad plate and the elastic member according to an embodiment of the present invention.

Meanwhile, Referring to FIGS. 6A and 6B, operation of the elastic members s1, s2, s3 and s4 according to other embodiment of the present invention can be seen. The first pad plate 131 is in close contact with a disc of a vehicle In FIGS. 6A and 6B. Herein, sliding grooves 'g' which is formed at the protrusions 131b of the first pad plate may be formed wider than the combined width of the elastic members s2 and s4. Further, the fourth elastic member s4 may provide a greater elastic return force with the second elastic member s2.

The second elastic member s2 is in contact with sliding grooves 'g' of the first pad plate 131, while holding the elastic return force. The fourth elastic member s4 does not abut on the sliding groove 'g' of the first pad plate 131 due to the short length. Namely, under normal circumstances that first friction pad 131 is unworn, the second elastic member s2 only operates.

Figure 7A:
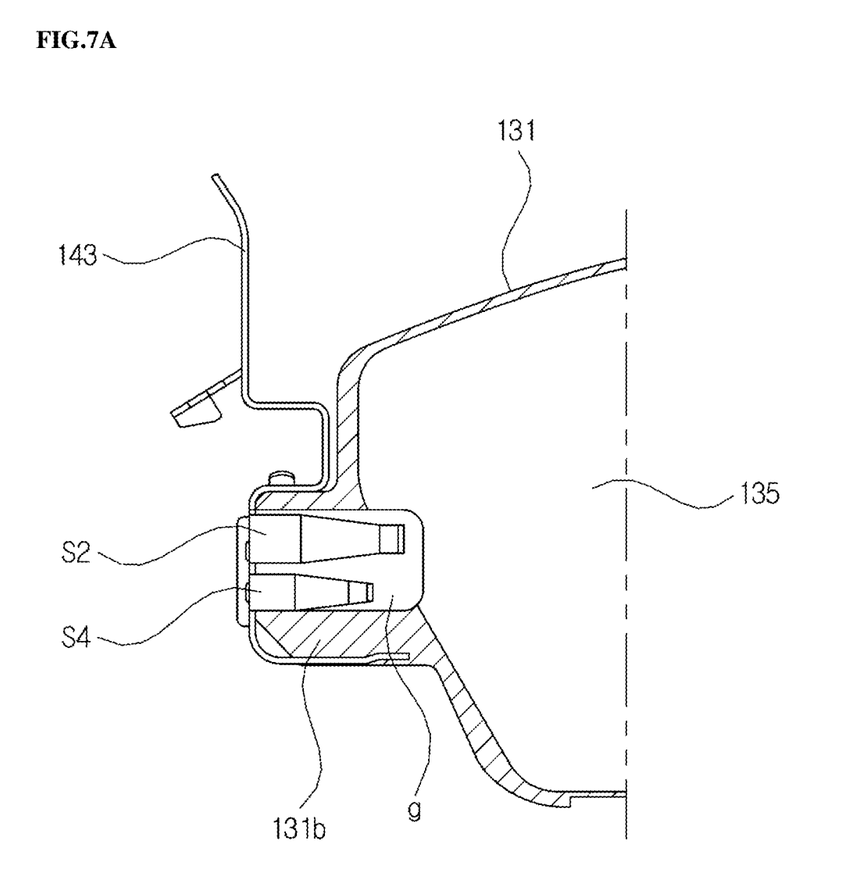
FIG. 7A is a view illustrating operation of the worn pad plate and the elastic member according to an embodiment of the present invention.
Figure 7B:
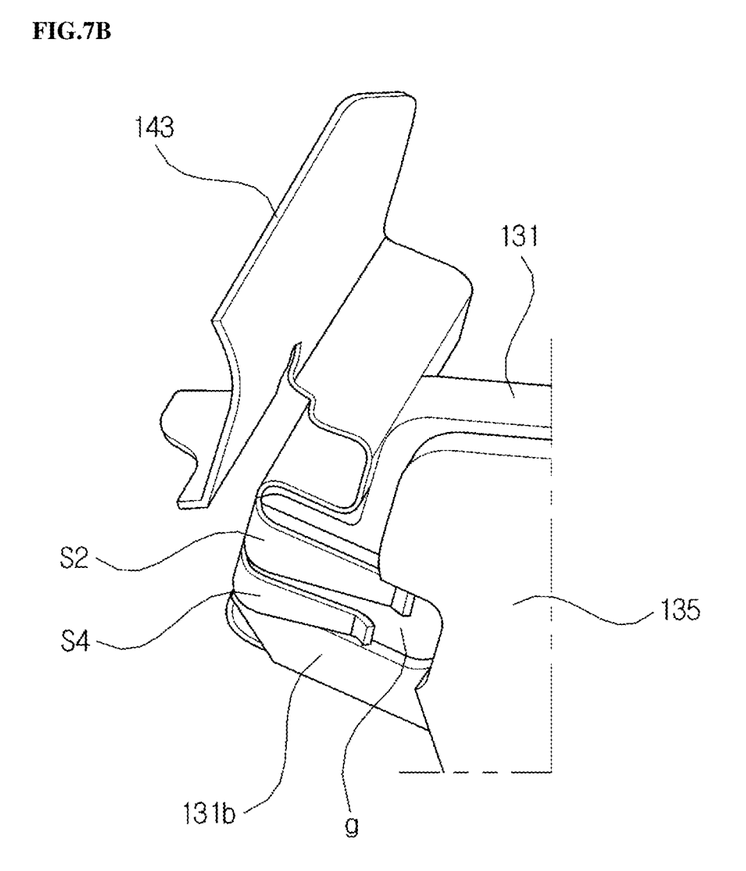
FIG. 7B is a perspective view illustrating operation of the worn pad plate and the elastic member according to an embodiment of the present invention.

On the other hand, referring to FIGS. 7A and 7B, the first friction pad 131 is worn state by repeated brake operation of caliper brake apparatus 100, at this time the fourth elastic member s4 according to other embodiment of the present invention is in contact with sliding grooves 'g' of the first pad plate 131, while holding the elastic return force.

Namely, the fourth elastic member s4 is not operating when the first friction pad 135 is normal, the fourth elastic member s4 is operating when the first friction pad 135 is worn state, and may be complementary to the insufficient elastic return force of the second elastic member s2.

Figure 8:
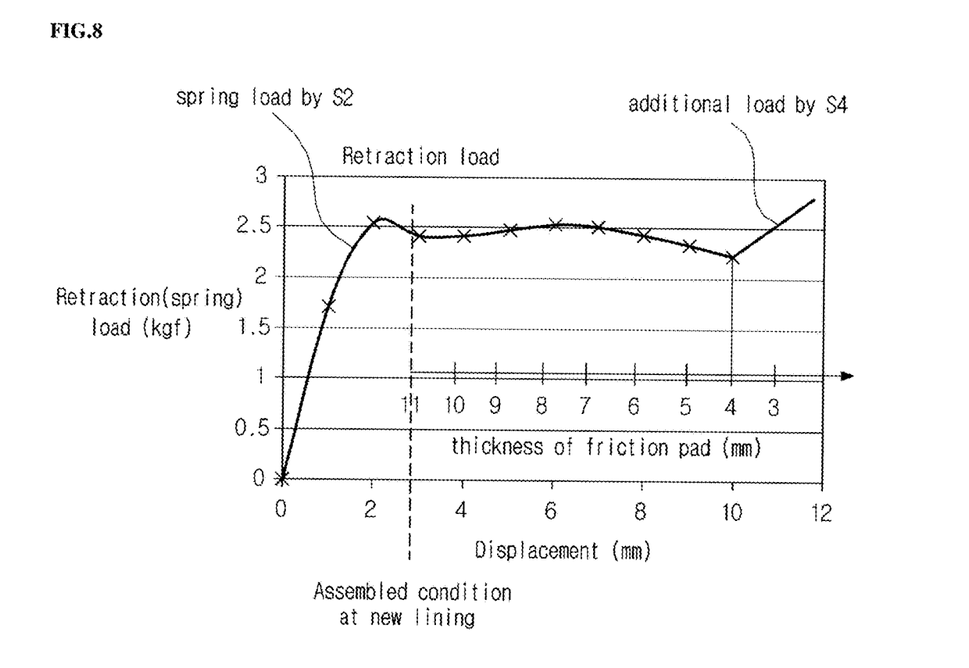
FIG. 8 is a graph illustrating retraction load of the elastic member according to an embodiment of the present invention.

Referring to FIG. 8, spring load (elastic return force) of the elastic members s2 and s4 according to the displacement of the pad plate can be seen.

The second elastic member s2 has a maximum spring load of approximately 2.5 when the first friction pad 135 is normal, the spring load of the second elastic member s2 is reduced from the time when the thickness of the friction pad 135 is reduced more than a certain thickness, the reduced spring load may be complemented by a spring load of the fourth elastic member s4.

For example, if the thickness of the first friction pad 135 is worn to less than 5 mm, the maximum spring load of the second elastic member s2 is reduced when the first pad plate 131 is moved about 8 mm in direction of the disc of the vehicle. Further, the fourth elastic member s4 is in contact with sliding grooves 'g' of the first pad plate 135 due to the worn friction pad 135, then the fourth elastic member s4 is slidably moved along the sliding grooves 'g' of the first pad plate 131 and has a spring load (additional load) and then may be complementary to the insufficient spring load of the second elastic member s2.

The graph of FIG. 8 is one example. Value of the spring load in the graph is not showing the correct absolute value and can vary depending on the applicable vehicles and specifications.

Accordingly, since the caliper brake apparatus 100 according to an embodiment of the present invention has a structure in which pad plates return in a sliding type, when the pad plates are released after being strongly pressed to a disc of a vehicle, sufficient gaps can be ensured between the disc and the pad plates, thereby reducing drag and improving fuel efficiency.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A caliper brake apparatus for a vehicle, comprising:
a housing comprising a cylinder;
a piston engaged with the cylinder and configured to move relative to the cylinder;
a carrier connected to the housing;
a pair of pad plates opposing to each other with a gap therebetween such that a periphery of a braking disc of the vehicle is positioned in the gap, wherein each pad plate is configured to move toward the braking disc according to movement of the piston; and
a pair of guides coupling the carrier to the pair of the pad plates,
wherein each pad plate has a sliding groove at both sides and each guide has elastic members that can slide along the sliding grooves,
wherein each guide comprises an upper plate, a lower plate, a protruding plate interconnecting the upper plate and the lower plate and protruding toward the pad plates,
wherein the lower end of the lower plate perpendicularly extends toward the par of pad plates.

2. The apparatus of claim 1, wherein a predetermined space is formed by cutting off center portions of the protruding plate and the lower plate.

3. The apparatus of claim 2, wherein the elastic members are formed at different heights inside the lower plate.

4. The apparatus of claim 3, wherein the elastic members bend at first ends that slide along the sliding grooves.

5. The apparatus of claim 2, wherein the elastic members are formed at inside the lower plate.

6. The apparatus of claim 5, wherein the elastic members are different length from each other.

7. The apparatus of claim 5, wherein the elastic members are different length from each other.

8. A caliper brake apparatus, comprising:
a housing comprising a cylinder;
a piston engaged with the cylinder and configured to move relative to the cylinder;
a carrier connected to the housing;
a pair of pad plates opposing to each other with a gap therebetween such that a periphery of a braking disc of the vehicle is positioned in the gap, wherein each pad plate is configured to move toward the braking disc according to movement of the piston; and
a pair of guides coupling the carrier to the pair of the pad plates,
wherein each pad plate has a sliding groove at both sides and each guide has elastic members that can slide along the sliding grooves,
wherein each guide comprises an upper plate, a lower plate, a protruding plate interconnecting the upper plate and the lower plate and protruding toward the pad plates,
wherein the caliper brake apparatus further comprises support steps fitted on the rear side of the protruding plate and formed on both sides of the carrier.

9. A caliper brake apparatus, comprising:
a housing comprising a cylinder;
a piston engaged with the cylinder and configured to move relative to the cylinder;
a carrier connected to the housing;
a pair of pad plates opposing to each other with a gap therebetween such that a periphery of a braking disc of the vehicle is positioned in the gap, wherein each pad plate is configured to move toward the braking disc according to movement of the piston; and
a pair of guides coupling the carrier to the pair of the pad plates,
wherein each pad plate has a sliding groove at both sides and each guide has elastic members that can slide along the sliding grooves,
wherein the first and second elastic members are decreased in width as they go to ends.

* * * * *